April 18, 1961     E. D. WILKERSON     2,979,822
HEADLIGHT TESTING METHOD AND APPARATUS
Filed Aug. 15, 1956     4 Sheets-Sheet 3
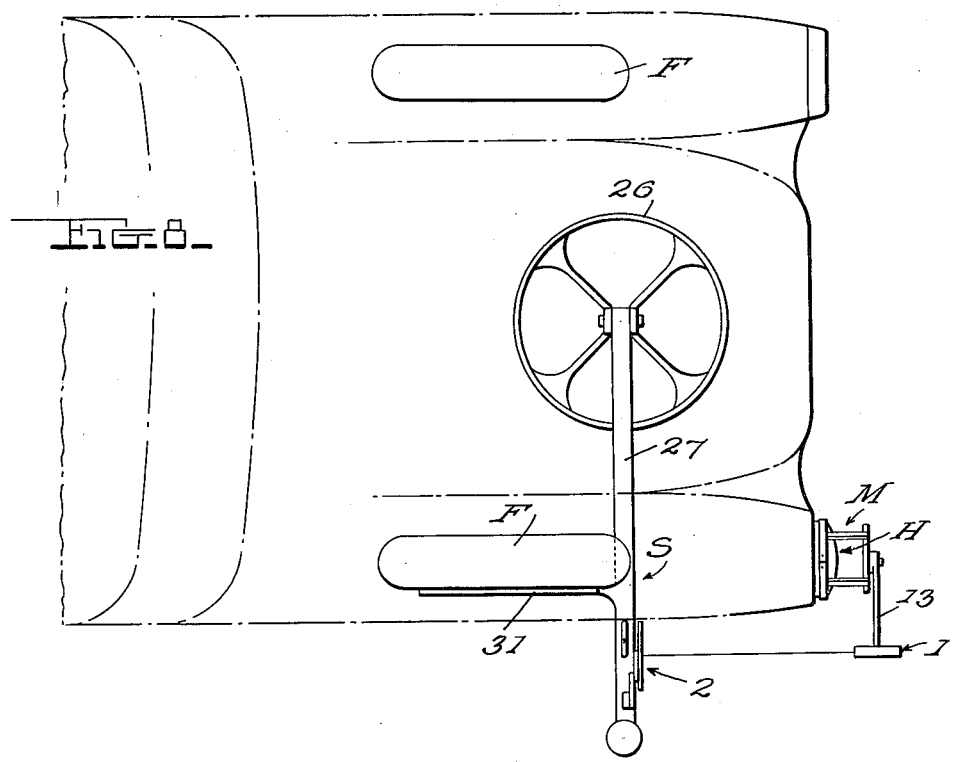
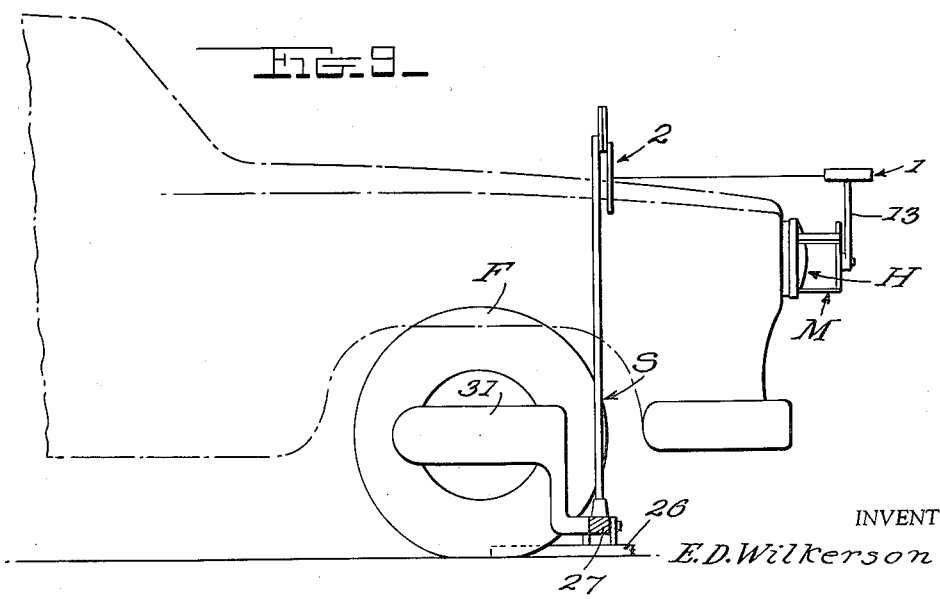
INVENTOR
E. D. Wilkerson April 18, 1961 E. D. WILKERSON 2,979,822
HEADLIGHT TESTING METHOD AND APPARATUS
Filed Aug. 15, 1956 4 Sheets-Sheet 4
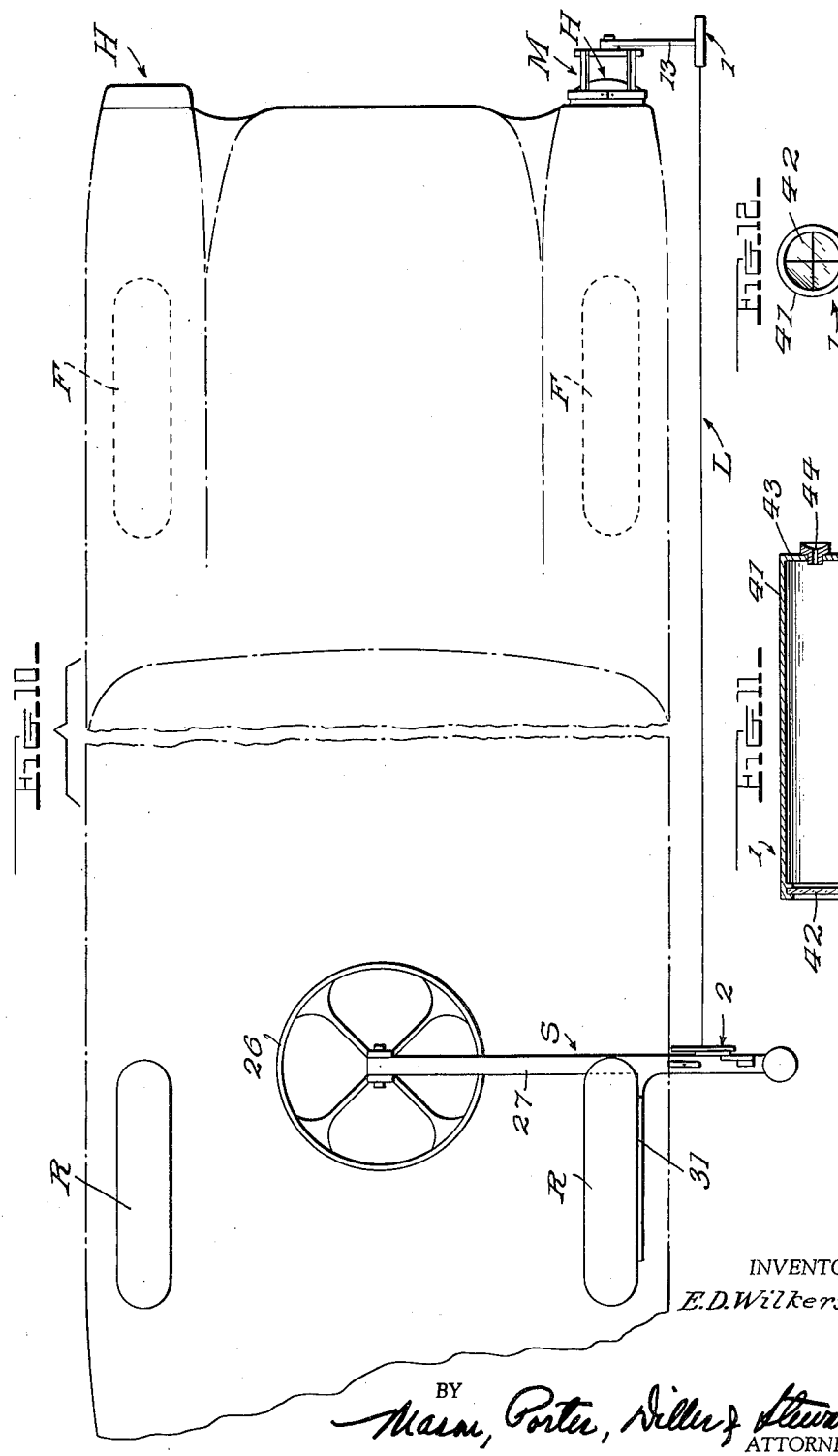
INVENTOR
E. D. Wilkerson
BY
ATTORNEYS

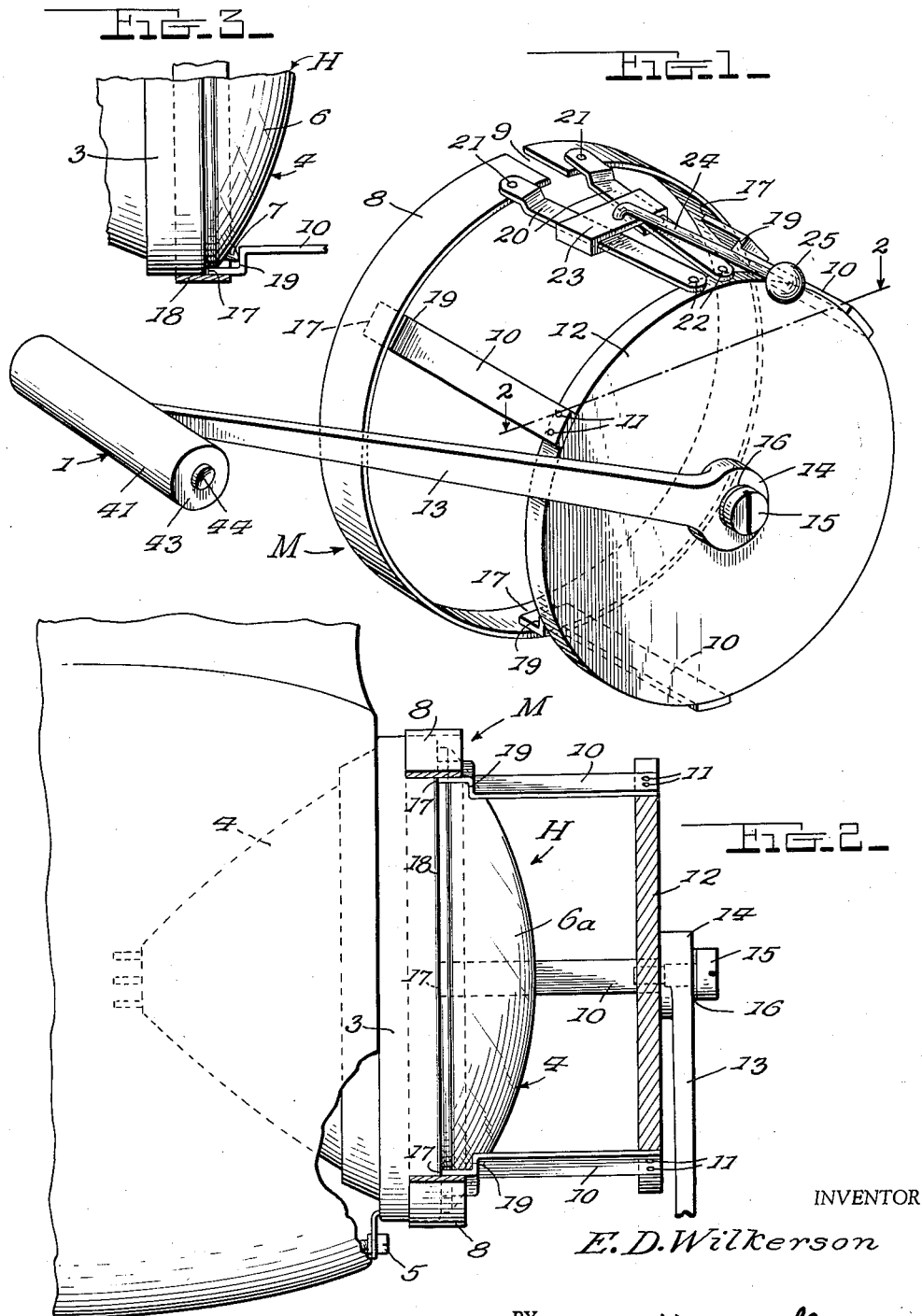

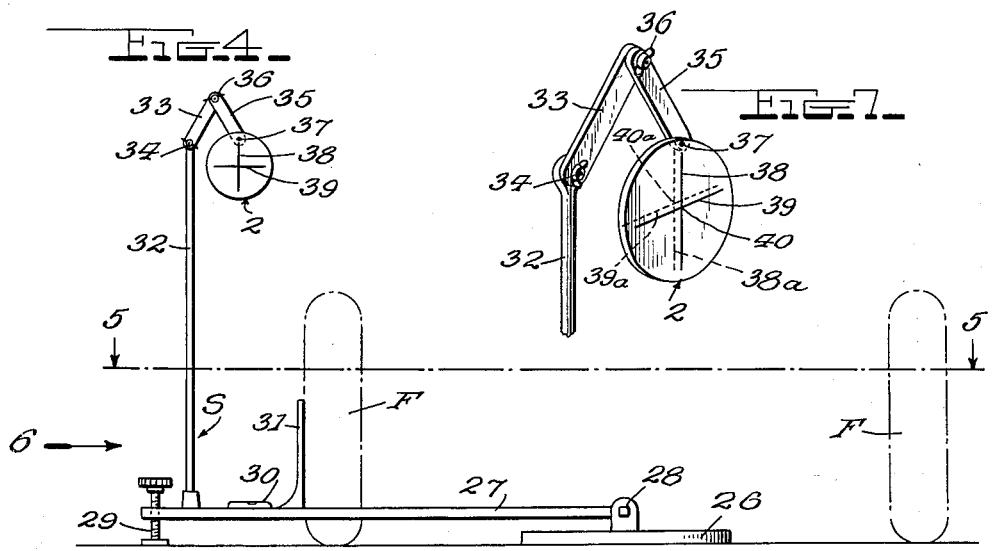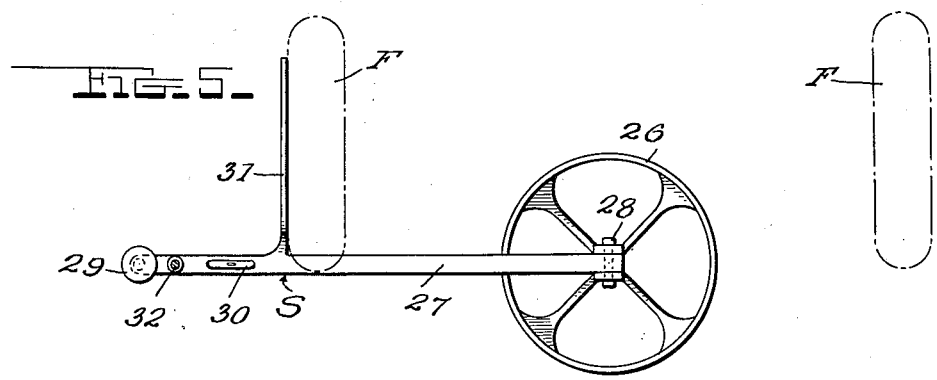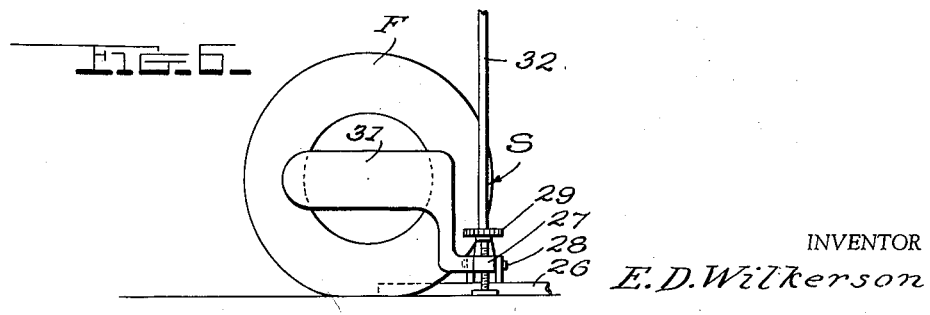

United States Patent Office 2,979,822
Patented Apr. 18, 1961

2,979,822

HEADLIGHT TESTING METHOD AND APPARATUS

Edward D. Wilkerson, 280 E. Northfield Road, Livingston, N.J.

Filed Aug. 15, 1956, Ser. No. 604,131

13 Claims. (Cl. 33—46)

This invention relates to the testing of automobile headlights to determine whether they are properly aimed or require directional adjustment—up, down, inwardly or outwardly.

In present use there are two basic methods of headlight aiming. One method is to use photo cells in front of the car at varying distances to measure any "off" angle of the headlight beams along the varied distance. This method attempts to find and extend the center line of the car forward by sighting the center of the vehicle hood or windshield or rear window. This is a rough reference at best. Also, to use this apparatus the garage or testing station floor must be flat and level for at least 25 feet. This is difficult in practice.

Another method is to "square the headlights up" parallel to each other for centerline reference by using the headlight rim (not the removable bezel) as a 90° reference to the beam of light and then using a gravity operated indicating means to set this rim in a vertical plane (at 90° to the beam of light). This same general method is also practiced with modern sealed-beam headlights by utilizing three conical projections on the headlight lens of each sealed-beam unit in "squaring the two units up" parallel with each other.

One difficulty with both of these methods is the gravity condition. The car must be level from front to rear and to accomplish this the garage or testing station floor must be level or flat for a distance of 25 feet.

Furthermore, in practicing both methods, the headlights are checked with respect to the car body and the latter may be warped or twisted and more or less out of alignment with the chassis, resulting in aiming the headlights somewhat diagonally of the road.

Another shortcoming of both methods is that they offer no way to prevent inaccurate testing due to a warped or twisted floor in the garage or testing station in which the testing is being done.

The present invention aims to so improve upon headlight testing methods and apparatus that inaccuracies heretofore inevitable will be eliminated.

In carrying out the above end, the invention aims to provide for checking the positional adjustment of the headlights with respect to the chassis, not the body, and thus any warped, twisted or misaligned condition of the body will not affect the test. Broadly speaking, such testing has been heretofore done but only, insofar as I know, by aligning the car wheels upon or parallel with a stripe on the garage or testing station floor and then projecting the headlight beams against a chart in fixed relation with the stripe. This method, however, is more or less obsolete and the present invention relates to more modern practice which utilizes a testing unit mounted on the headlights. The invention brings into this more modern practice the advantage of the more or less obsolete practice and at the same time eliminates shortcomings of the latter.

The improved method is carried out with the aid of front and rear testing units, the front unit being mounted on a headlight to be tested and the rear unit being mounted on a manually movable support; and an object of the invention is to bring said front and rear units into testing relation with each other by placing the rear unit support against the rear wheel of the chassis at the same side of the car as the headlight being tested.

A further object is to facilitate the initial setting of the two testing units in proper vertical and horizontal relation with the chassis by placing the rear unit support against the front chassis wheel at the aforesaid side of the car, said units being then brought into testing relation with each other by shifting the rear unit support rearwardly and placing this support against the rear wheel.

A still further object is to provide the rear unit support in the form of a floor stand constructed to compensate for unlevel or twisted garage or testing station floors.

Yet another object is to provide a novel construction for mounting the front testing unit on the rim (not the removable bezel) of any headlight to be tested.

The mounting means for the front testing unit includes a contractable band to surround a headlight rim, arms projecting forwardly from said band, and a front member to which said arms are secured: and another object is to so relate said arms with said band that the rear ends of said arms may abut the front edge of a headlight rim to properly position the mounting means on the headlight.

A further object is to provide the aforesaid arms with rearwardly facing shoulders to abut the conical projections on the lens of a modern sealed-beam unit, to properly position the mounting means on the headlight.

A still further object is to provide novel hand-operated means for quickly and easily contracting the aforesaid band around the headlight rim.

With the above and other objects in view that will hereinafter appear, the nature of the invention will be more clearly understood by reference to the following detailed description, the appended claims and the several views illustrated in the accompanying drawings.

In the drawings:

Figure 1 is a perspective view of the front testing unit mounting means.

Figure 2 is a top plan view partly broken away and partly in section on line 2—2 of Figure 1, showing the bezel removed from the right hand sealed-beam headlight of an automobile and showing the front testing unit mounting means secured in place upon the headlight rim, the sealed-beam unit being of the old type having no conical projections on its lens.

Figure 3 is a detail sectional view showing the new type of sealed-beam headlight and the shoulder of one of the aforesaid arms abutting one of the conical projections of the lens.

Figure 4 is a front elevation showing the rear testing unit and the floor stand on which it is mounted.

Figure 5 is a top plan view partly in section as indicated by line 5—5 of Figure 4.

Figure 6 is a side elevation as indicated by the arrow 6 of Figure 4.

Figure 7 is a perspective view showing the manner of adjustably mounting the rear testing unit and the floor stand.

Figures 8 and 9 are diagrammatic views showing respectively a top plan view and a side elevation partly in section, showing the manner of initially setting the front and rear units in predetermined cooperative relation with each other and including the placing of the floor stand against a front chassis wheel.

Figure 10 is a diagrammatic top plan view showing the floor stand moved rearwardly and disposed against the rear wheel to place the rear testing unit in testing relation with the front unit.

Figure 11 is a longitudinal sectional view of the front testing unit.

Figure 12 is a rear end view of the front testing unit.

Preferences have been disclosed in the drawings and will be rather specifically described but it will be understood that variations may well be made. Also, while the front testing unit is shown in the form of a sighting device 1 and the cooperable rear unit in the from of a target 2, a light beam projector could well be substituted for said sighting device 1 and a photo-electric cell substituted for said target 2, to operate an indicator. Also, while a sight line from a front testing unit to a rear testing unit is utilized in the present form of the invention, it is feasible to make provision for using an actual line or cord, or a straight-edge.

In Figure 1, the means M for mounting the sighting device 1 on a headlight, is shown; and in view of the fact that most headlights are now of sealed-beam type, said mounting means M has been shown mounted on such a headlight H in Figures 2 and 3. This type of headlight includes a rim 3 carrying the sealed-beam unit 4 and adjustable by means of screws 5 to aim the headlight as required. The lens 6 of the unit 4, in the new style form of construction (Figure 3), is provided with three, circumferentially spaced, forward projections 7 for use in aiming the headlight. The lens 6a of the old style form (Figure 2), however, is devoid of such projections. The sighting device mounting means M is applicable with accuracy to both the new and the old and is constructed as described below.

A circular band 8 is provided to encircle the rim 3, said band being transversely split at 9. Three rigid arms 10 are brazed, welded or otherwise secured at their rear ends to the inner periphery of the rim 8, the spacing of said arms agreeing with the spacing of the lens projections 7. The front ends of the arms 10 are suitably secured at 11 to the edge of a rigid front disk 12; and an arm 13, carrying the sighting device 1, is mounted on said disk 12. This arm has a hub 14 clamped by a screw 15 and spring washer 16 to the center of the disk 12, permitting pivotal adjustment of said arm after the band 8 has been clamped on the headlight. The parts are so related that the longitudinal center line of the sighting device 1 is parallel with the longitudinal axis of the sealed-beam unit 4 with the arm 13 in any position.

The rear end surfaces 17 of the arms 10 are positioned to abut the front edge 18 of the rim 3 of an old style sealed beam unit shown in Figure 2. Toward their rear ends, these arms 10 have offsets providing rearwardly facing shoulders 19 to abut the lens projections 7 of a new style sealed-beam unit, as seen in Figure 3. In either case, the mounting means M may thus be accurately related with the headlight.

Two rearwardly diverging links 20 are pivoted at their rear ends to the ends of the split band 8 as seen at 21. The front ends of these links 20 are pivoted at 22 to the front disk 12. A slide 23 is engaged with the links 20 to swing these links toward each other when said slide is moved rearwardly, thereby contracting the band 8 around the headlight rim 3. In the present disclosure, the band 8 is of self-expanding form and therefore releases when the slide 23 is moved forwardly, but this slide could well be constructed to positively move the links 20 in band releasing direction when said slide is moved forwardly. A suitable operating rod 24 is shown for the slide 23, said rod having a knob 25 at its front end.

A floor stand S for mounting the target 2 is shown in Figures 4 to 7. This stand includes a base 26 to rest on a garage or testing station floor at a position midway between the front chassis wheels or the rear chassis wheels of an automobile, the headlights H of which are to be tested. In Figures 4 to 6 and 8 and 9, the front wheels are shown at F. In Figure 10, both the front wheels F and the rear wheels R are shown.

A substantaily horizontal arm 27 is pivoted at one end to the base 26 for vertical adjustment, as seen at 28. The other end of this arm 27 carries a floor-engaging adjusting screw 29 for leveling said arm if the floor be somewhat inclined transversely of the car chassis or even twisted. To determine if the arm 27 requires leveling and for showing when it has been adjusted to level position, a spirit level 30 is mounted on the outer end portion of said arm. This arm portion is also provided with a rigidly attached positioning plate 31 at 90° to its length and adapted to abut the outer side of first a front wheel F and later the corresponding rear wheel R, as later explained. While, in the present disclosure the plate 31 may be considered as abutting the wheel tire, it could well abut a hub cap or a portion of the wheel proper, for example one of the bead engaging flanges. It is therefore to be understood that "the outer side" and associated language above used, is intended to include these possibilities.

A standard 32 rises rigidly from the outer end portion of the arm 27 and the target 2 is mounted on this standard. A link 33 is shown pivotally clamped at 34 to the upper end of the standard 32, and a second link 35 is pivotally clamped at 36 to the outer end of said link 33. The target 2 is pendulously hung at 37 from the outer end of the link 35.

One side of the target 2 has a vertical line 38 and a horizontal line 39 which cross each other at the point 40. The other side of the target has similar lines 38a and 39a crossing at a point 40a, as shown in dotted lines in Figure 7. One side of the target is used when testing the right hand headlight of a car and the other side of said target is used when the stand S is turned around for testing the left hand headlight. In both instances, the sighting device 1 is cooperable with the target. This sighting device 1 is preferably of the form described below with reference to Figures 11 and 12.

An elongated tubular body 41 has one end closed by a crossed-hair-line lens 42; and the other end of said body is closed at 43 and provided with a central peephole 44. The body 41 may be permanently or demountably mounted on the arm 13 of the mounting means M.

*Operation and method steps (see Figures 8, 9 and 10)*

It will be assumed that the right hand headlight is to be tested first. The sighting device 1 is mounted on this right hand headlight as shown in Figures 8 and 9. The stand S, carrying the target 2, is then placed against the right front wheel of the chassis and the arm 27 is leveled. Now, the arm 13, carrying the sighting device 1 and the target 2 are relatively adjusted until the center of the crossed-hair lens 42 of said sighting device 1 coincides with the point 40 of the target 2. Having thus placed the sighting device 1 and target 2 in this predetermined cooperative relation, the stand S, carrying the target 2, is moved rearwardly and engaged (see Figure 10) with the rear right wheel R of the chassis, without otherwise disturbing the position of said target 2 on the stand, and the arm 27 is re-leveled if required. The testing technician then again sights through the sighting device 1 and if the aforesaid predetermined cooperative relation (target point 40 coinciding with center of lens 42) still exists, it is known that the right hand headlight requires no directional adjustment. However, if said predetermined cooperative relation does not still exist and the sight line L strikes an off-center part of the target, it is known that re-aiming may be then accurately accomplished by adjusting the screws 5 of the sealed-beam unit 4 until the center of the lens 42 again coincides with the target point 40. After testing and adjusting the right hand headlight, the same procedure is followed for the left hand headlight, the point 40a of the target being then used.

In the preceding, it has been assumed that the testing operations and any required headlight re-aiming are performed in the average garage in which it is customary to both inspect and adjust. However, the invention is useable equally well in state and city inspection stations in which testing operations only are performed, leaving it to the car owner to have required adjustments made and return for final inspection, windshield sticker, etc.

From the foregoing, it will be seen that novel and advantageous provision has been disclosed for attaining the desired ends. However, attention is again invited to the possibility of making variations within the scope of the invention.

I claim:

1. A method of testing the alignment of a headlight at one side of an automobile, with the aid of front and rear testing units and supports therefor; comprising the steps of mounting the front testing unit support on the headlight, accurately locating the rear testing unit support with respect to the longitudinal center of the automobile chassis by placing it against the front wheel at said side of the automobile, relatively adjusting said front and rear units positionally into predetermined visual cooperative relation with each other, moving said rear testing unit support rearwardly without otherwise disturbing said rear testing unit and accurately locating said rear support with respect to said chassis center by placing it against the rear wheel at said side of the automobile, and checking whether the two units have remained in said predetermined visual cooperative relation with each other or indicate the necessity of re-aiming the headlight.

2. A method of testing the headlight at one side of an automobile, with the aid of a sighting device and a floor stand carrying a target; comprising the steps of mounting said sighting device on the headlight with its sight line at 90° to the plane of the headlight rim, placing said stand on the floor against the outer side of the front wheel at said one side of the automobile and disposing said target in a plane at substantially 90° to the normal plane of said front wheel, relatively adjusting said sighting device and target positionally until a predetermined point on said target is visible when sighting through said sighting device, moving said stand and target rearwardly without otherwise disturbing said target, placing said stand on the floor against the outer side of the rear wheel at said one side of the automobile and disposing said target in a plane at substantially 90° to the plane of this rear wheel, and again sighting through said sighting device to determine whether the aforesaid point on the target is again visible without re-aiming the headlight.

3. In an automobile testing apparatus, a front testing unit and means for mounting it on a headlight, a rear testing unit, a support upon which said rear testing unit is mounted for positional adjustment, said support being shiftable from a front wheel of the chassis to the corresponding rear wheel thereof, said support having a wheel abutting member to space it the same distance from the longitudinal center of the chassis whether said support be disposed at said front wheel or at said rear wheel, said front and rear testing units being relatively adjustable into predetermined cooperable relation when said support is at said front wheel, said front and rear units being further cooperable when said support is moved to said rear wheel to show whether said predetermined cooperative relation still exists or indicates that headlight re-aiming is necessary.

4. A structure as specified in claim 3, in which said front testing unit includes a sighting device and said rear testing unit includes a target to be viewed through said sighting device.

5. In a headlight testing apparatus, a base to rest upon a floor under an automobile and substantially midway between the right and left wheels, a substantially horizontal arm pivoted at its inner end to said base for vertical movement, an adjustable floor-engaging support on the outer end of said arm for leveling the latter, a positioning member secured to the outer end portion of said arm to abut the outer side of one of the automobile wheels, a standard secured to said outer end portion of said arm and disposed perpendicular thereto, and a testing unit mounted on said standard.

6. A structure as specified in claim 5 in which said testing unit consists of a target; one swingable link adjustably clamped to the upper end of said standard, and a second swingable link adjustably clamped to the outer end of said one link, said target being pendulously connected to the outer end of said second link.

7. In a headlight testing apparatus, a band to surround a headlight rim, said band being transversely split, link arm and slide means connected to the ends of said band for contracting and expanding the latter, circumferentially spaced positioning arms secured to and projecting forwardly from said band, a front member secured to the front ends of said positioning arms, front ends of said link arms being pivotally connected to said front member, and a testing unit carrying arm secured to said front member.

8. In a headlight testing apparatus, a band to surround a headlight rim, said band being transversely split, link arm and slide means connected to the ends of said band for contracting and expanding the latter, circumferentially spaced positioning arms secured to and projecting forwardly from said band, a front member secured to the front ends of said positioning arms, and a testing unit carrying arm secured to said front member, said positioning arms having their rear ends secured against the inner periphery of said band and positioned to abut the front edge of the headlight rim.

9. In a headlight testing apparatus, a band to surround a headlight rim, said band being transversely split, link arm and slide means connected to the ends of said band for contracting and expanding the latter, circumferentially spaced positioning arms secured to and projecting forwardly from said band, a front member secured to the front ends of said positioning arms, and a testing unit carrying arm secured to said front member, the rear end portions of said positioning arms being provided with rearwardly facing offset shoulders to abut the customary light-aiming projections of a sealed-beam headlight unit.

10. In a headlight testing apparatus, a band to surround a headlight rim, said band being transversely split, means connected to the ends of said band for contracting the latter, circumferentially spaced arms secured to and projecting forwardly from said band, a front member secured to the front ends of said arms, and a testing unit carrying arm secured to said front member, said band contracting means comprising two rearwardly diverging links pivoted at their front ends to said front member and pivoted at their rear ends to said band ends, and a slide engaged with said links for moving them toward each other to contract said band and also apart for expanding same.

11. In a headlight testing apparatus, a band to surround a headlight rim, said band being transversely split, link arm and slide means connected to the ends of said band for contracting and expanding the latter, circumferentially spaced positioning arms secured to and projecting forwardly from said band, a front member secured to the front ends of said positioning arms, and a testing unit carrying arm secured to said front member, said positioning arms having their rear ends secured against the inner periphery of said band and positioned to abut the front edge of the headlight rim, the rear end portions of said positioning arms also being provided with rearwardly facing offset shoulders to abut the customary light-aiming projection of a sealed-beam headlight unit, thereby to adapt the band for mounting on the front edge of a headlight rim of a headlight not equipped with a sealed beam light having light-aiming projections or upon the light-aiming projections of a headlight unit.

12. In a headlight testing apparatus, a floor stand having a positioning member to abut an automobile wheel, and a testing unit mounted on said floor stand, said testing unit carrying a target that has been pre-positioned for both horizontal and vertical references to the headlight under test, said stand including an upstanding standard having a support on which said target is supported, said target support including one swingable link adjustably clamped to the upper end of said standard, and a second swingable link adjustably clamped to the outer end of said one link, said target being pendulously connected to the outer end of said second link, and said testing apparatus including a sighting device to be connected to a headlight to sight alongside the automobile and onto said target.

13. A method of testing the alignment of a headlight at one side of an automobile comprising the steps of mounting a front testing unit of the sighting type on the headlight in alignment therewith, accurately locating a rear testing unit of the target type with respect to the longitudinal center of the automobile chassis by placing the rear testing unit against the automobile front wheel at the one side of the automobile, visually sighting the rear testing unit through the front testing unit and relatively adjusting the front and rear testing units positionally into predetermined visual cooperating relation with each other, then moving the rear testing unit rearwardly without otherwise disturbing the setting of the rear testing unit and again accurately locating the rear testing unit with respect to the longitudinal center of the automobile chassis by placing the rear testing unit against the automobile rear wheel at the one side of the automobile, and again visually sighting the rear testing unit through the front testing unit to see whether the front and rear testing units have remained in the predetermined visual cooperating relation or a reaiming of the headlight is necessary.

References Cited in the file of this patent
UNITED STATES PATENTS

| | | |
|---|---|---|
| 147,210 | Wederkinch | Feb. 3, 1874 |
| 1,010,007 | Adams | Nov. 28, 1911 |
| 1,400,772 | Schleth | Dec. 20, 1921 |
| 1,677,028 | Frech | July 10, 1928 |
| 1,837,670 | Phelps | Dec. 22, 1931 |
| 1,863,136 | Hood et al. | June 14, 1932 |
| 2,097,310 | Sayles | Oct. 26, 1937 |
| 2,176,214 | Falge | Oct. 17, 1939 |
| 2,261,741 | Mathieu | Nov. 4, 1941 |
| 2,314,559 | Schilling | Mar. 23, 1943 |
| 2,358,010 | Holmes | Sept. 12, 1944 |
| 2,552,116 | Rodeghiero | May 8, 1951 |
| 2,557,893 | Russell et al. | June 19, 1951 |
| 2,767,480 | Hearn | Oct. 23, 1956 |
| 2,797,494 | Irwin | July 2, 1957 |
| 2,831,262 | Falge et al. | Apr. 22, 1958 |

FOREIGN PATENTS

| | | |
|---|---|---|
| 499,430 | Belgium | Dec. 15, 1950 |
| 535,330 | Great Britain | Apr. 7, 1941 |
| 589,362 | Great Britain | June 18, 1947 |